(12) United States Patent
Tavildar et al.

(10) Patent No.: US 10,159,087 B2
(45) Date of Patent: Dec. 18, 2018

(54) CHANNEL STATE INFORMATION FRAMEWORK FOR ADVANCED RECEIVERS

(71) Applicant: QUALCOMM Incorporated, San Diego, CA (US)

(72) Inventors: Saurabha Rangrao Tavildar, Jersey City, NJ (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/272,119

(22) Filed: Sep. 21, 2016

(65) Prior Publication Data

US 2017/0171876 A1    Jun. 15, 2017

Related U.S. Application Data

(60) Provisional application No. 62/266,561, filed on Dec. 11, 2015.

(51) Int. Cl.

| | |
|---|---|
| *H04W 4/00* | (2018.01) |
| *H04W 72/12* | (2009.01) |
| *H04B 7/06* | (2006.01) |
| *H04L 1/00* | (2006.01) |
| *H04W 8/22* | (2009.01) |

(Continued)

(52) U.S. Cl.
CPC ...... *H04W 72/1226* (2013.01); *H04B 7/0626* (2013.01); *H04B 7/0632* (2013.01); *H04L 1/0026* (2013.01); *H04L 1/0027* (2013.01); *H04W 8/22* (2013.01); *H04W 24/02* (2013.01); *H04W 72/0413* (2013.01); *H04B 7/0413* (2013.01)

(58) Field of Classification Search
CPC combination set(s) only.
See application file for complete search history.

(56) References Cited

U.S. PATENT DOCUMENTS

| 7,499,437 B2 | 3/2009 | Das et al. |
| 8,798,551 B2 | 8/2014 | Yuan et al. |

(Continued)

FOREIGN PATENT DOCUMENTS

| EP | 2930968 A1 | 10/2015 |
| WO | WO-2008156319 A2 | 12/2008 |

OTHER PUBLICATIONS

International Search Report and Written Opinion—PCT/US2016/063947—ISA/EPO—dated Feb. 22, 2017.

*Primary Examiner* — Frank Duong
(74) *Attorney, Agent, or Firm* — Patterson & Sheridan, L.L.P (57) ABSTRACT

Certain aspects of the present disclosure provide methods for transmitting, by a user equipment (UE) channel state information (CSI) feedback when the UE is capable of an advanced function, for example, when the UE is capable of successive interference cancellation (SIC) and/or joint decoding. An exemplary method generally includes determining a first time scale for transmitting capability information regarding receiver performance at the UE, determining a second time scale for transmitting channel condition information, and transmitting the capability information according to the determined first time scale and the channel condition information according to the determined second time scale.

26 Claims, 5 Drawing Sheets

(51) Int. Cl.
*H04W 24/02* (2009.01)
*H04W 72/04* (2009.01)
*H04B 7/0413* (2017.01)

(56) References Cited

U.S. PATENT DOCUMENTS

| | | |
|---|---|---|
| 9,155,098 B2 | 10/2015 | Geirhofer et al. |
| 9,319,197 B2 * | 4/2016 | Sahin .................... H04L 1/0025 |
| 9,763,232 B2 * | 9/2017 | Kim ....................... H04L 5/0057 |
| 9,769,835 B2 * | 9/2017 | Nordstrom .......... H04W 72/082 |
| 2014/0301271 A1 | 10/2014 | Xu et al. |
| 2015/0207604 A1 | 7/2015 | Sun et al. |

* cited by examiner

CHANNEL STATE INFORMATION FRAMEWORK FOR ADVANCED RECEIVERS

CLAIM OF PRIORITY UNDER 35 U.S.C. § 119

This application claims benefit of U.S. Provisional Patent Application Ser. No. 62/266,561, filed Dec. 11, 2015, which is herein incorporated by reference in its entirety

FIELD

Certain aspects of the present disclosure generally relate to wireless communications and, more particularly, to a channel state information (CSI) framework for advanced receivers.

BACKGROUND

In order to address the issue of increasing bandwidth requirements that are demanded for wireless communication systems, different schemes are being developed to allow multiple user terminals to communicate with a single access point (AP) by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single AP and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac (Very High Throughput (VHT)) standards. A receiver STA may be able to detect a transmission mode of the signal based on information included in a preamble of the transmission packet.

A downlink multi-user MIMO (MU-MIMO) system based on Spatial Division Multiple Access (SDMA) transmission can simultaneously serve a plurality of spatially separated STAs by applying beamforming at the AP's antenna array. Complex transmit precoding weights can be calculated by the AP based on channel state information (CSI) received from each of the supported STAs.

SUMMARY

Certain aspects of the present disclosure provide a method for wireless communications. The method generally includes determining a first time scale for transmitting capability information regarding receiver performance at the UE, determining a second time scale for transmitting channel condition information, and transmitting the capability information according to the determined first time scale and the channel condition information according to the determined second time scale.

Certain aspects of the present disclosure provide an apparatus for wireless communications by a user equipment (UE). The apparatus generally includes at least one processor configured to determine a first time scale for transmitting capability information regarding receiver performance at the UE, determine a second time scale for transmitting channel condition information, and transmit the capability information according to the determined first time scale and the channel condition information according to the determined second time scale. Additionally, the UE includes a memory coupled with the at least one processor.

Certain aspects of the present disclosure provide an apparatus for wireless communications by a user equipment (UE). The apparatus generally includes means for determining a first time scale for transmitting capability information regarding receiver performance at the UE, means for determining a second time scale for transmitting channel condition information, and means for transmitting the capability information according to the determined first time scale and the channel condition information according to the determined second time scale.

Certain aspects provide a non-transitory computer-readable medium for wireless communications by a user equipment (UE). The non-transitory computer-readable medium generally includes instructions for determining a first time scale for transmitting capability information regarding receiver performance at the UE, determining a second time scale for transmitting channel condition information, and transmitting the capability information according to the determined first time scale and the channel condition information according to the determined second time scale.

Certain aspects of the present disclosure provide a method for wireless communications by a base station (BS). The method generally includes receiving, from a UE, capability information regarding receiver performance at the UE, receiving, from the UE, channel condition information, wherein the BS receives the channel condition information more often than the capability information, and scheduling the UE based, at least in part, on the capability information and the channel condition information.

Certain aspects of the present disclosure provide an apparatus for wireless communications by a base station (BS). The BS generally includes at least one processor configured to determine a first time scale for transmitting capability information regarding receiver performance at the UE, determine a second time scale for transmitting channel condition information, and transmit the capability information according to the determined first time scale and the channel condition information according to the determined second time scale.

Certain aspects of the present disclosure provide an apparatus for wireless communications by a base station (BS). The BS generally includes means for determining a first time scale for transmitting capability information regarding receiver performance at the UE, means for determining a second time scale for transmitting channel condition information, and means for transmitting the capability information according to the determined first time scale and the channel condition information according to the determined second time scale.

Certain aspects provide a non-transitory computer-readable medium for wireless communications by a base station (BS). The non-transitory computer-readable medium generally includes instructions for receiving, from a UE, capability information regarding receiver performance at the UE, receiving, from the UE, channel condition information, wherein the BS receives the channel condition information more often than the capability information, and scheduling the UE based, at least in part, on the capability information and the channel condition information.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Certain aspects of the present disclosure provide a channel state information (CSI) framework for advanced receivers, for example, receivers capable of successive interference cancellation (SIC) and/or joint decoding. For example, aspects of the present disclosure propose techniques for decoupling instantaneous channel conditions feedback from receiver performance (e.g., of a UE) feedback. According to certain aspects, decoupling instantaneous channel conditions feedback from receiver performance feedback may improve power and/or time/frequency resource usage by reducing signaling overhead.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be, for example, advantageous to systems employing Ultra Wide Band (UWB) signals including millimeter-wave signals. However, the present disclosure is not intended to be limited to such systems, as other coded signals may benefit from similar advantages.

The teachings herein may be incorporated into (e.g., implemented within or performed by) a variety of wired or wireless apparatuses (e.g., nodes). In some aspects, a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Access Node (AN), or some other terminology. In some implementations, an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

Figure 1:
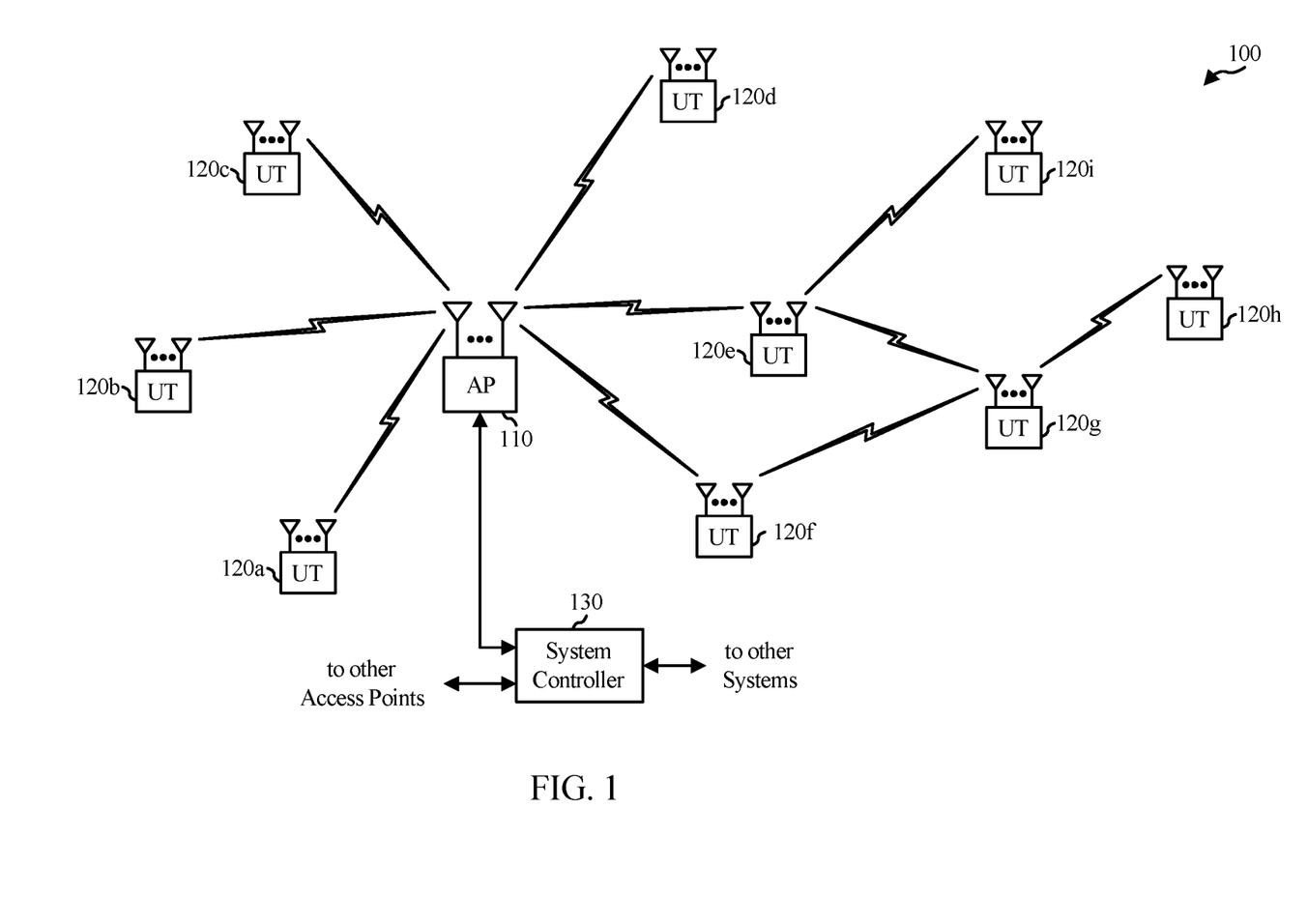
FIG. 1 illustrates a wireless communications network, according to certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). MIMO system 100 may represent a high speed Wireless Local Area Network (WLAN) operating in a 60 GHz band.

Figure 2:
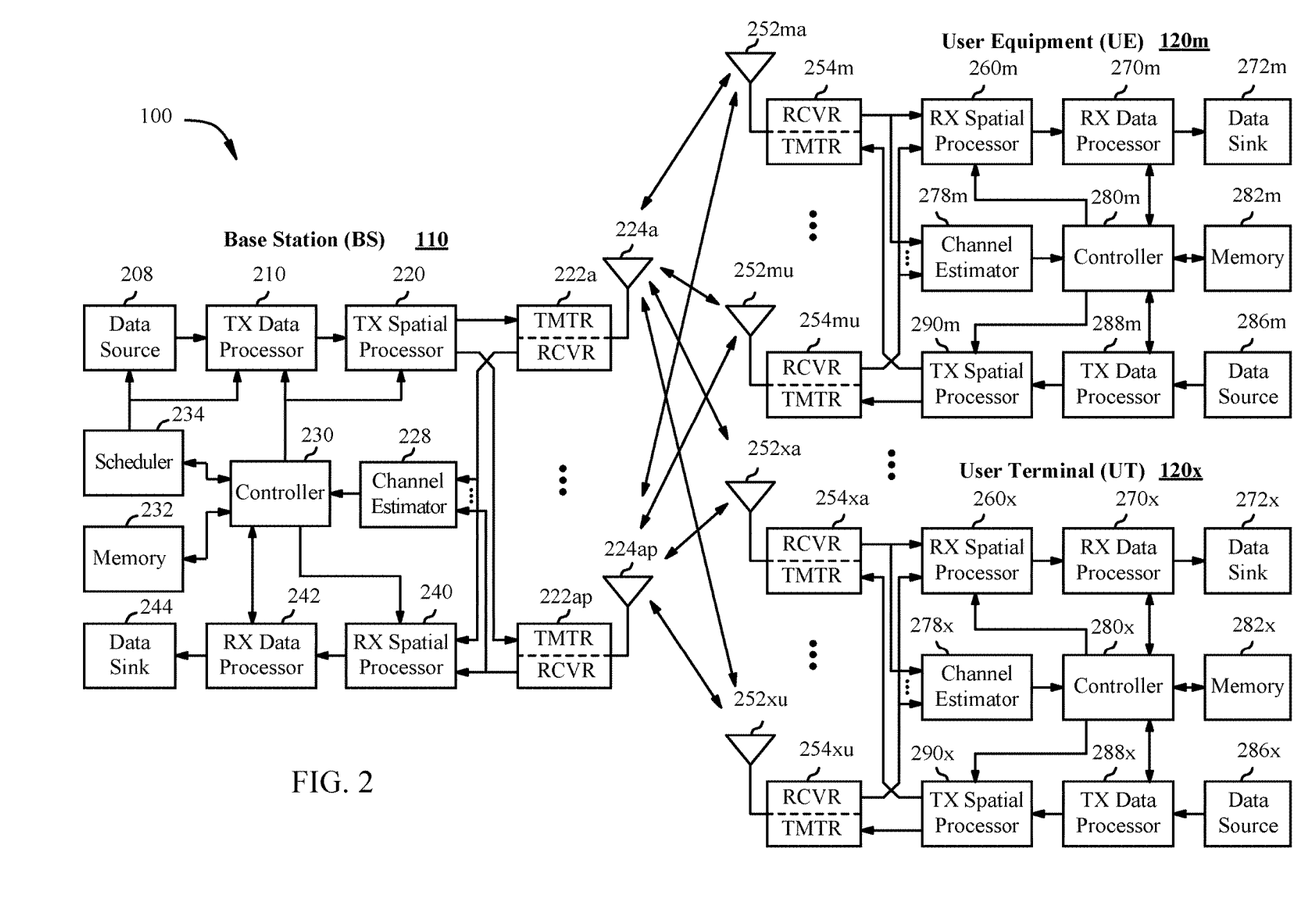
FIG. 2 illustrates a block diagram of an example access point and user terminals, according to certain aspects of the present disclosure.

FIG. 2 shows a block diagram of access point/base station 110 and two user terminals/user equipments 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Certain aspects of the present disclosure support constructing, at the AP 110 (e.g., by the TX data processor 210), a frame with a first indication about a plurality of modulation-coding schemes (MCSs) supported by the AP 110 for receiving a corresponding different number of spatial streams (SSs) (e.g., from the user terminals 120). The transmitter 222 of the AP 110 may be configured to transmit the constructed frame to one or more of the user terminals 120.

Certain aspects of the present disclosure support receiving, from the AP 110 at the user terminal 120 using the receiver 254, a frame with a first indication about a plurality of MCSs supported by the AP 110 for receiving a corresponding different number of SSs. The user terminal 120 (e.g., the RX data processor 270) may be configured to select a rate for communication to the AP 110 based at least in part on the first indication.

Figure 3:
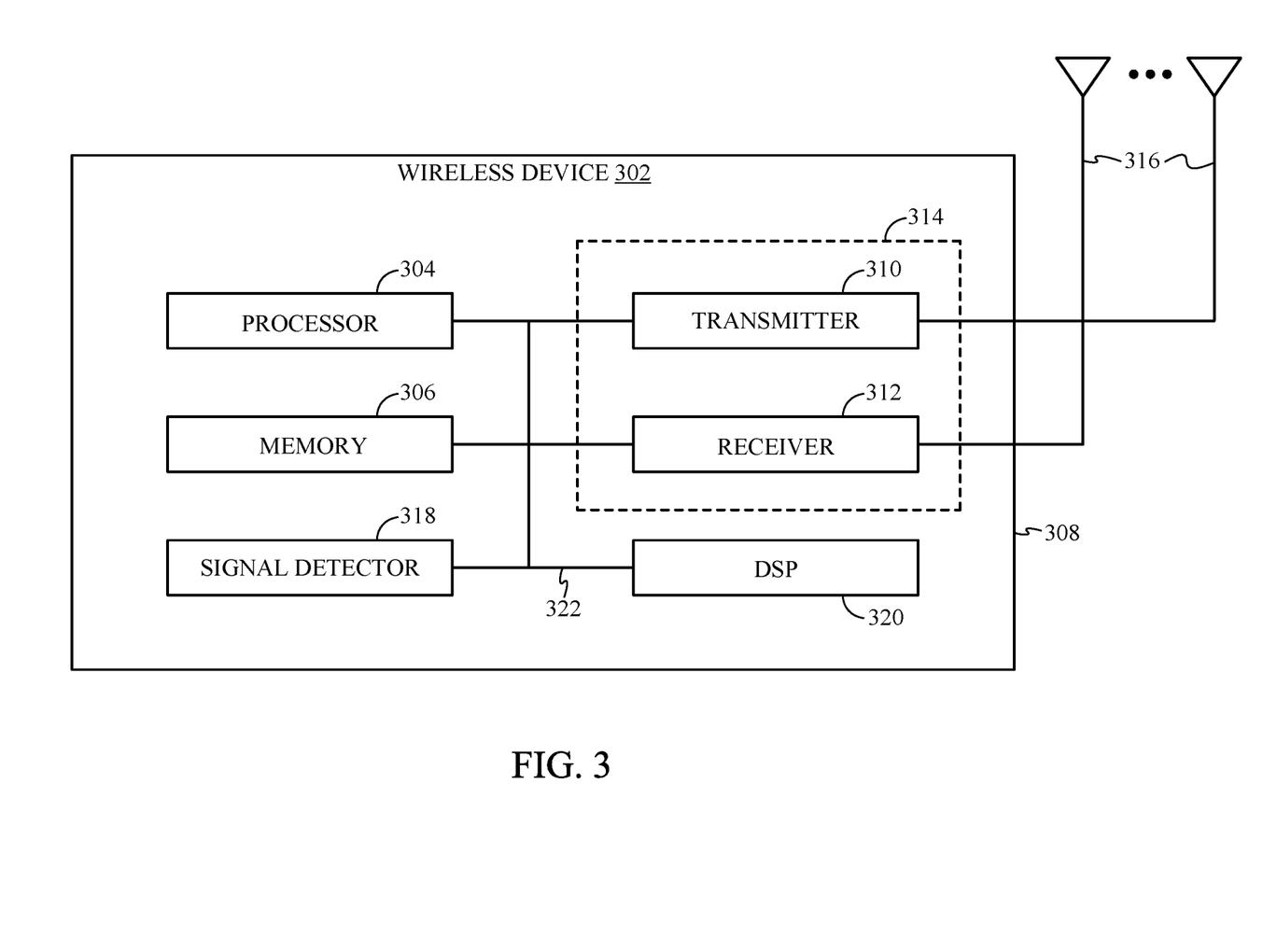
FIG. 3 illustrates a block diagram of an example wireless device, according to certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Channel State Information Framework for Advanced Receivers

In wireless communications, channel state information (CSI) refers to known channel properties of a communication link. This information describes how a signal propagates from the transmitter to the receiver and represents the combined effect of, for example, scattering, fading, and power decay with distance. CSI comprises various information such as a channel quality indicator (CQI), a rank indicator (RI), and a precoding matrix indicator (PMI). CQI can be thought of a signal to interference ratio and once a user equipment (UE) reports a CQI, the network is able to schedule the UE using a modulation coding scheme (MCS) selected according to the reported CQI.

Nowadays, instead of treating interference as noise, UEs are able to perform more sophisticated signal processing, such as successive interference cancellation (SIC) and joint decoding, to separate out multiple signals from a combined signal. SIC is the ability of a receiver to receive two or more signals concurrently (that otherwise cause a collision in today's systems). A collision may be defined as the simultaneous arrival of two or more packet transmissions at a receiver. Traditionally, only the strongest signal could be decoded, treating the other signal as interference. However, SIC additionally facilitates recovery of even the weaker signal. For example, when using SIC, the bits of the stronger signal may be decoded as before. The original (stronger) signal is then reconstructed from these bits, and subtracted (i.e., cancelled) from the combined signal (i.e., the signal containing both the stronger and weaker signals). The bits of the weaker packet are then decoded from the residue signal (i.e., the signal left over after subtracting the stronger signal). This can be an iterative process to recover multiple packets and hence it is termed successive interference cancellation.

However, while SIC improves a UEs ability to process received signals, issues exist on how to provide channel state information (CSI) feedback from UEs capable of advanced signal processing (e.g., SIC and/or joint decoding).

Performance of interference cancellation (e.g., SIC)/joint decoding depends on various factors/information, such as channel conditions (e.g., signal/interference levels, including the signal covariance matrix, $R_{ss}$, and the interference covariance matrix, $R_{nn}$), signal and interference characteristics (e.g., the modulation and coding scheme of the signal and interference, transmission mode, and the precoding matrix of the signal as well as interference), and the receiver (Rx) implementation at the UE (e.g., some UEs may not do any smart processing, some UEs may do interference cancellation, some UEs may do joint decoding, etc.).

In some cases, providing this information to the base station may be expensive in terms of power and time/frequency resources. Thus, aspects of the present disclosure provide solutions on how to report this multi-dimensional information to the base station on a more cost-effective basis. For example, aspects of the present disclosure provide techniques that allow for the decoupling of information that changes on a fast time scale (e.g., channel conditions) from information that changes on a slow time scale (e.g., signal/interference characteristics and Rx implementation).

Certain observations have been made regarding the above noted information. For example, channel conditions, which are measured by the UE, need to be reported to the eNB on a fast time scale, whereas signal/interference characteristics, which are under network control (i.e., the network decides what/how to transmit), may not need to be reported by the UE at all. Further, Rx implementation at the UE is UE specific and does not change, and thus may not need to be reported often. Thus, aspects of the present disclosure propose techniques for reducing the amount of information that needs to be reported by the UE for CSI feedback, thereby improving power and time/frequency resource usage.

Figure 4:
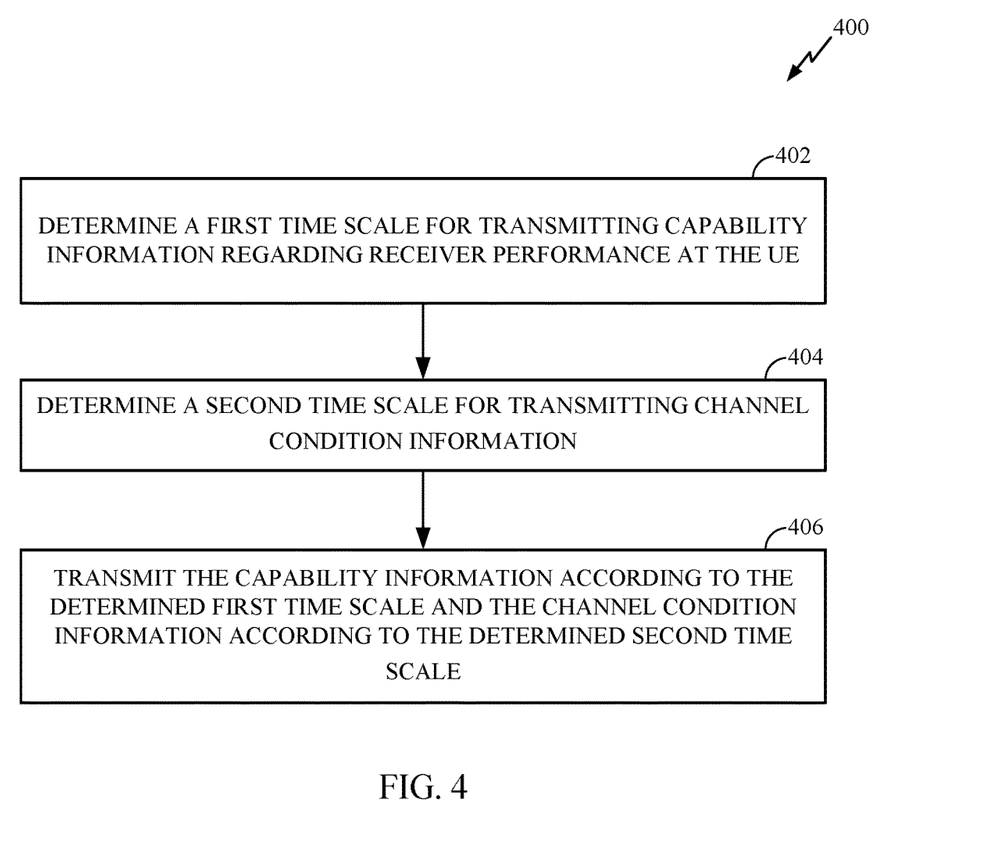
FIG. 4 illustrates example operations for wireless communications by a UE, according to certain aspects of the present disclosure.

FIG. 4 illustrates example operations 400 for wireless communications. According to certain aspects, operations 400 may be performed by a user equipment (e.g., one or more of the UEs 120) for transmitting channel state information (CSI) feedback. According to certain aspects, the UE may have an advanced receiver capability. For example, the UE may be able to perform successive interference cancellation (SIC) and/or joint decoding, as described above.

Operations 400 begin at 402 by determining a first time scale for transmitting capability information regarding receiver performance at the UE. At 404, the UE determines a second time scale for transmitting channel condition information. At 406, the UE transmits the capability information according to the determined first time scale and the channel condition information according to the determined second time scale.

Figure 5:
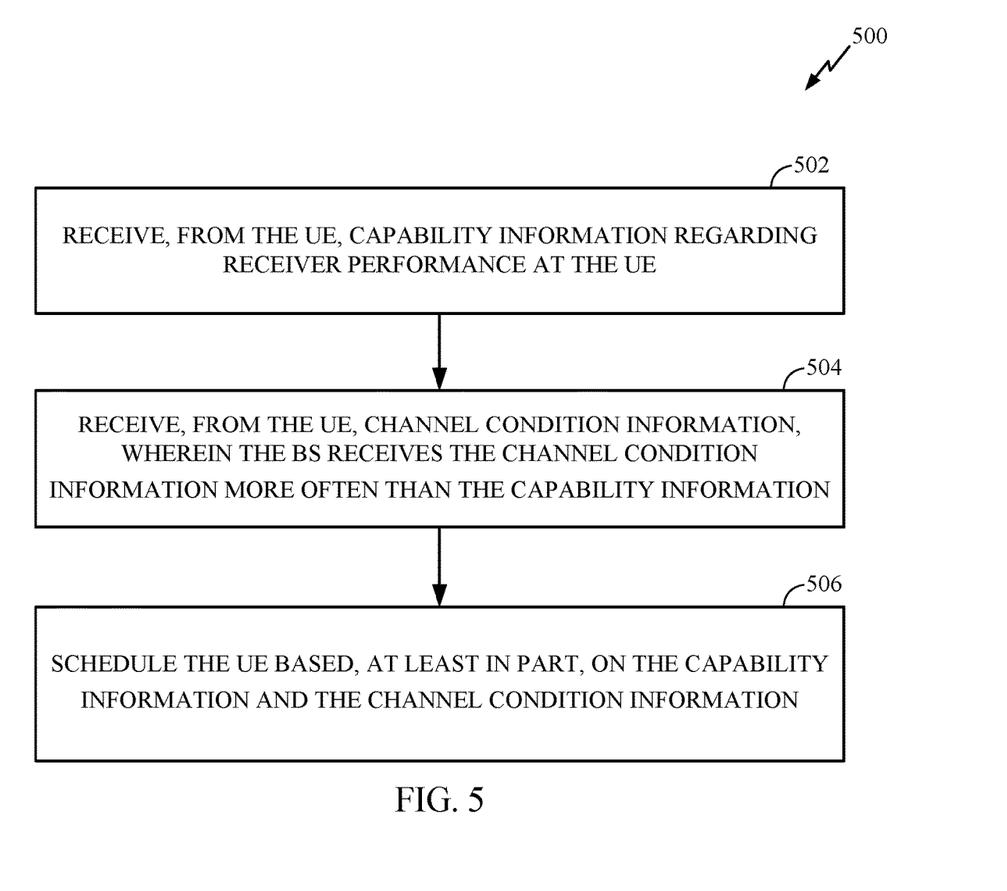
FIG. 5 illustrates example operations for wireless communications by a BS, according to certain aspects of the present disclosure.

FIG. 5 illustrates example operations 500 for wireless communications. According to certain aspects, operations 500 may be performed by a base station (e.g., one or more of the BSs 110) for receiving channel state information (CSI) feedback from a user equipment (UE). The operations 500 may be considered complimentary to operations 400, performed at a UE.

Operations 500 begin at 502 by receiving, from the UE, capability information regarding receiver performance at the UE. At 504, the BS receives, from the UE, channel condition information, wherein the BS receives the channel condition information more often than the capability information. At 506, the BS schedules the UE based, at least in part, on the capability information and the channel condition information.

According to certain aspects, the operations 400 may reduce the amount of information that needs to be reported by a UE for CSI feedback, thereby improving power and time/frequency resource usage. For example, aspects of the present disclosure propose a technique in which a UE determines a slow time scale (e.g., a first time scale) to report capability information of the UE (e.g., receiver performance at the UE) as a function various signal and interference characteristics and also a fast time scale to report instantaneous channel and/or interference condition information observed by the UE. According to certain aspects, the capability information may be a function of the signal and interference condition information.

Additionally, according to certain aspects, the UE may determine the slow time scale and the fast time scale based on information, received from a base station (e.g., the UE's serving base station), indicating the slow time scale and the fast time scale.

According to certain aspects, reporting on a slow time scale may involve transmitting, by the UE, the capability information less frequently as compared to the instantaneous channel and interference condition information transmitted on a fast time scale. That is, the UE may transmit the channel and interference condition information more often than the capability information.

According to certain aspects, the capability information may indicate a block error ratio (BLER) for each of signal mutual information (S-MI) and interference mutual information (I-MI). According to certain aspects, the S-MI may be a function of at least one of a signal rank, a modulation and coding scheme (MCS), or a transmission mode (TM). Additionally, according to certain aspects, the I-MI may be a function of at least one of an interference rank, an MCS, or a TM.

In addition to the techniques described above, there may also be further optimizations to reduce the CSI feedback signaling overhead. For example, a UE may decide to report only the highest MCSs for which a 90% BLER point is achieved for a number of transport blocks received by the UE from a base station, disregarding signaling of the other MCS values (e.g., MCSs below the 90% BLER point).

As noted above, the UE may report/transmit on a fast time scale (i.e., more frequently than the capability information) instantaneous channel and interference conditions (e.g., as CQI). For example, reporting the CQI may involve reporting signal mutual information, interference mutual information, and quantized signal and interference matrices ($R_{ss}$ and $R_{nn}$). According to certain aspects, the quantized signal and interference matrices may be quantized (e.g., limited) to a finite number of values.

According to certain aspects, a base station may receive, from the UE, the capability information and channel conditions information and may schedule the UE based, at least in part, on the received capability information and channel conditions information.

The various operations of methods described above may be performed by any suitable means capable of performing the corresponding functions. The means may include various hardware and/or software component(s) and/or module (s), including, but not limited to a circuit, an application specific integrate circuit (ASIC), or processor. Generally, where there are operations illustrated in the Figures, those operations may be performed by any suitable corresponding counterpart means plus function components.

According to certain aspects, such means may be implemented by processing systems configured to perform the corresponding functions by implementing various algorithms (e.g., in hardware or by executing software instructions) described above.

For example, means for determining and means for scheduling may comprise one or more processors (e.g., RX Data Processor 242, 270, Controller 230, 280, and/or TX Data Processor 210, 288) of the BS 110 or UEs 120 illustrated in FIG. 2. Additionally, means for transmitting and means for receiving may comprise one or more of a transmitter/receiver (e.g., one or more of the transceiver TX/RX 222, 254) or one or more antenna (e.g., one or more of the antennas 224, 252).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of wireless communication performed by a user equipment (UE) for transmitting channel state information (CSI) feedback in a wireless network, comprising:
   determining a first time scale for transmitting capability information regarding receiver performance at the UE, wherein the capability information comprises information indicating receiver performance at the UE as a function of channel condition information;
   determining a second time scale for transmitting the channel condition information; and
   transmitting, via at least one antenna, the capability information according to the determined first time scale and the channel condition information according to the determined second time scale.

2. The method of claim 1, wherein determining the first time scale and the second time scale comprises receiving information from a base station indicating the first time scale and the second time scale.

3. The method of claim 1, wherein the UE transmits the channel condition information more often than the capability information.

4. The method of claim 1, wherein the channel condition information comprises information regarding at least one of signal conditions or interference conditions.

5. The method of claim 1, wherein the capability information comprises a block error ratio (BLER) for signal-mutual information (S-MI) as a function of at least one of a signal rank, a modulation and coding scheme (MCS), or a transmission mode (TM).

6. The method of claim 5, wherein when the capability information comprises an MCS, the MCS comprises an MCS for which a ninety-percent BLER point is achieved for a number of transport blocks received by the UE from a base station.

7. The method of claim 1, wherein the capability information comprises a block error ratio (BLER) for interference-mutual information (I-MI) as a function of at least one of an interference rank, a modulation and coding scheme (MCS), or a transmission mode (TM).

8. The method of claim 7, wherein when the capability information comprises an MCS, the MCS comprises an MCS for which a ninety-percent BLER point is achieved for a number of transport blocks received by the UE from a base station.

9. The method of claim 1, wherein the channel condition information comprises at least one of a signal level, an interference level, a signal matrix, or an interference matrix.

10. The method of claim 9, wherein the at least one of the signal matrix or the interference matrix is quantized to a finite number of values.

11. A method of wireless communication by a base station (BS) for receiving channel state information (CSI) feedback from a user equipment (UE), comprising:
   receiving, from the UE, capability information regarding receiver performance at the UE, wherein the capability information comprises information indicating receiver performance at the UE as a function of channel condition information;
   receiving, from the UE, the channel condition information, wherein the BS receives the channel condition information more often than the capability information; and
   scheduling the UE based, at least in part, on the capability information and the channel condition information.

12. The method of claim 11, wherein the capability information comprises a block error ratio (BLER) for interference-mutual information (I-MI) as a function of at least one of an interference rank, a modulation and coding scheme (MCS), or a transmission mode (TM).

13. The method of claim 11, further comprising transmitting to the UE an indication of a first time scale to use for transmitting the capability information and an indication of a second time scale to use for transmitting the channel condition information.

14. The method of claim 11, wherein the channel condition information is received more often than the capability information.

15. The method of claim 11, wherein the capability information comprises a block error ratio (BLER) for signal-mutual information (S-MI) as a function of at least one of a signal rank, a modulation and coding scheme (MCS), or a transmission mode (TM).

16. The method of claim 11, wherein the channel condition information comprises information regarding at least one of signal conditions or interference conditions.

17. The method of claim 11, wherein the channel condition information comprises at least one of a signal level, an interference level, a signal matrix, or an interference matrix.

18. The method of claim 17, wherein the at least one of the signal matrix or the interference matrix is quantized to a finite number of values.

19. An apparatus for wireless communication performed by a user equipment (UE) for transmitting channel state information (CSI) feedback, comprising:
   at least one processor configured to:
      determine a first time scale for transmitting capability information regarding receiver performance at the UE, wherein the capability information comprises information indicating receiver performance at the UE as a function of channel condition information;
      determine a second time scale for transmitting the channel condition information; and
      transmit, via at least one antenna, the capability information according to the determined first time scale and the channel condition information according to the determined second time scale; and
   a memory coupled with the at least one processor.

20. The apparatus of claim 19, wherein the channel condition information comprises information regarding at least one of signal conditions or interference conditions.

21. The apparatus of claim 19, wherein the at least one processor is configured to transmit the channel condition information more often than the capability information.

22. The apparatus of claim 19, wherein the at least one processor is further configured to receive information from a base station indicating the first time scale and the second time scale, and wherein the at least one processor is configured to determine the first time scale and the second time scale based on the information received from the base station.

23. An apparatus for wireless communication by a base station (BS) for receiving channel state information (CSI) feedback from a user equipment (UE), comprising:
at least one processor configured to:
receive, from the UE, capability information regarding receiver performance at the UE, wherein the capability information comprises information indicating receiver performance at the UE as a function of channel condition information;
receive, from the UE, the channel condition information, wherein the BS receives the channel condition information more often than the capability information; and
schedule the UE based, at least in part, on the capability information and the channel condition information; and
a memory coupled with the at least one processor.

24. The apparatus of claim 23, wherein the at least one processor is further configured to transmit to the UE an indication of a first time scale to use for transmitting the capability information and an indication of a second time scale to use for transmitting the channel condition information.

25. The apparatus of claim 23, wherein the at least one processor receives the channel condition information more often than the capability information.

26. The apparatus of claim 23, wherein the channel condition information comprises information regarding at least one of signal conditions or interference conditions.

* * * * *